Figure 4:
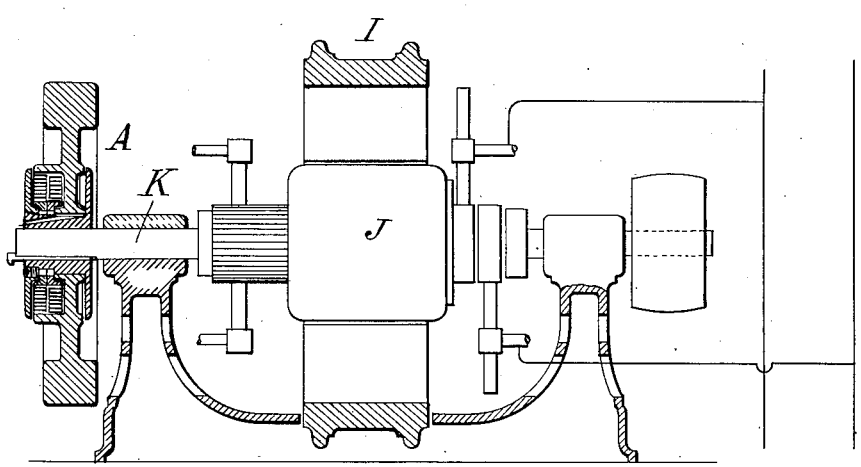

No. 741,290. PATENTED OCT. 13, 1903.
J. J. WOOD.
MEANS FOR PREVENTING FLUCTUATIONS IN ROTARY MOTORS.
APPLICATION FILED JULY 16, 1900.
NO MODEL. 2 SHEETS—SHEET 1.
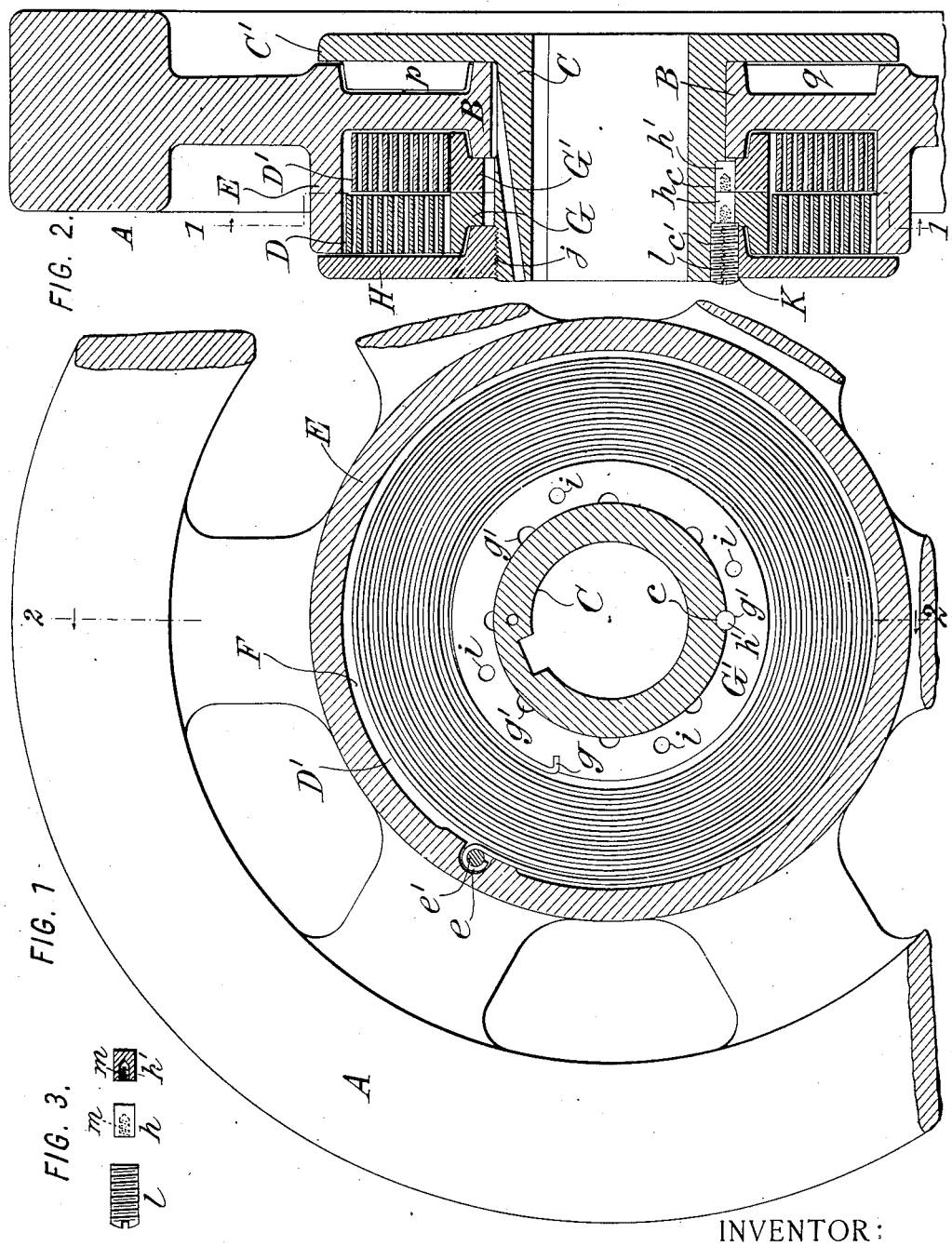
WITNESSES:
Fred White
Thomas F. Wallace
INVENTOR:
James J. Wood,
By Attorneys,
Arthur E. O'Brien & Co.

No. 741,290. Patented October 13, 1903.

UNITED STATES PATENT OFFICE.

JAMES J. WOOD, OF FORT WAYNE, INDIANA, ASSIGNOR TO GENERAL ELECTRIC COMPANY, A CORPORATION OF NEW YORK.

MEANS FOR PREVENTING FLUCTUATIONS IN ROTARY MOTORS.

SPECIFICATION forming part of Letters Patent No. 741,290, dated October 13, 1903.

Application filed July 16, 1900. Serial No. 23,701. (No model.)

*To all whom it may concern:*

Be it known that I, JAMES J. WOOD, a citizen of the United States, residing at Fort Wayne, in the county of Allen and State of Indiana, have invented certain new and useful Improvements in Means for Preventing Fluctuations in Rotary Motors, of which the following is a specification.

This invention relates to means for preventing or reducing fluctuations occurring in rotary-motor devices—such as steam-engines, turbines, impact-wheels, or other prime movers—as well as secondary motor devices, such as dynamo-electric machines, electric motors, rotary converters, and the like.

My invention is applicable wherever in such a rotary motor fluctuations are liable to occur from a uniform rotation by reason either of variations in the propulsive energy or variations in the work or load, which variations recur at frequent intervals, so that they tend to produce alternate accelerations and retardations of the motor, such as are known in the art as "hunting" or "pumping."

In my application filed May 31, 1900, Serial No. 18,646, I have set forth a device for preventing such fluctuations, particularly with reference to synchronous dynamo-electric machines, such as alternating motors or rotary converters. In operating such machines the hunting or beating action is usually indicative of some irregularity in the circuit feeding the motor. This irregularity may consist of variations either in speed or in electromotive force. The variation in speed of the generator tends to cause a corresponding variation in the speed of a synchronous motor. The motor cannot, however, assume instantly the speed required by the new speed of the generator. When the speed of the generator increases, the motor-armature begins to increase in speed; but by reason of its lagging the motor receives an increased current, because its armature is not in normal position for the new frequency and because additional current is required for supplying the energy necessary for increasing its speed. This additional current produces a difference of magnetism of the field, which must again be altered when the generator speed decreases below the average. The motor is therefore undergoing a slight variation in speed, which seeks to approximate to, but does not exactly correspond with, that of the generator. As set forth in my said application with particular reference to synchronous alternating motors, I overcome this defect and avoid interference with the line by applying to the shaft of the motor or a shaft rotating therewith a fly-wheel of suitable weight, which is yieldingly connected to the motor, preferably by being free to turn upon its driving-shaft, a spring connection being interposed between the fly-wheel and its shaft, so as to oppose relative movements of the motor and fly-wheel in either direction. The degree of such relative movement preferably corresponds to the angular distance between two adjacent poles of the armature. The spring connection therein shown comprises a coiled spring or springs interposed endwise between abutments formed upon the fly-wheel and its shaft, said springs being compactly arranged between these parts and suitable stops being provided for limiting the strain upon the springs. While well adapted for use with motors in which the angle between the poles is not considerable, as is the case with motors having a relatively great number of poles, difficulties have been encountered in adapting such devices to motors having comparatively few poles. This is due to the fact that because of the relatively great angle between the poles springs of this character are not well adapted to permit the necessarily extensive rotary movement of the fly-wheel in a connection which provides the requisite compactness, durability, and strength.

By my present invention I aim to provide a construction which is especially adapted for use with motors having two or more poles, while retaining the advantages of the construction just described.

In its preferred form my invention provides a connection between the fly-wheel and its shaft, which comprises a pair of spiral springs, preferably involute springs, each connected at its opposite ends to the fly-wheel and its shaft, respectively, and the springs reversely arranged, so that relative movements of the fly-wheel and shaft in both directions are resisted by the tension or compression of the springs exerted in such manner as to tend to wind or unwind them. The springs preferably encircle the axis of rotation of the fly-wheel and are suitably housed or inclosed, preferably within the fly-wheel. Certain other features of improvement are provided in the construction and arrangement of the parts.

Figure 5:
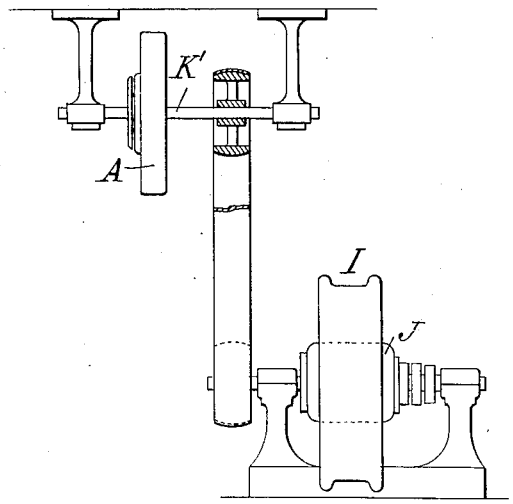

In the drawings, in which I have illustrated the preferred form of my invention, Figure 1 is a face view of the fly-wheel, partly in section, on the line 1 1 in Fig. 2. Fig. 2 is a diametrical section of Fig. 1, cut on the line 2 2; and Fig. 3 is an elevation of the locking plugs or keys detached, the one $h'$ being shown in mid-section; and Figs. 4 and 5 illustrate two applications of my invention to a synchronous dynamo-electric machine.

In the drawings, A indicates a fly-wheel of any suitable construction having a hub B, Fig. 2, designed to fit loosely upon a sleeve C, which is adapted to be keyed or otherwise fixed to a shaft rotating with the motor. In rotary electric machines the sleeve C is most conveniently keyed directly to the armature-shaft. The fly-wheel A is mounted to turn freely upon its sleeve C, except that such rotation is resisted by springs D D', which oppose such movement in both directions. Each of the springs D D' is of spiral form, being shown as an involute, and is fixed at one end to the fly-wheel A and at its other end to the sleeve C, and the springs are preferably reversely arranged, so that each is wound or unwound by such relative movement. It is characteristic of the present invention that the spring or springs are so arranged that relative movements of the fly-wheel and motor tend to wind or unwind the springs. Such springs are best arranged so that they encircle the axis of rotation of the fly-wheel, preferably as shown, by embracing the shaft of the motor.

Any suitable means may be provided for connecting the ends of the springs to the fly-wheel and shaft; but I prefer that shown, because of the convenience in putting such springs under the requisite tension. The fly-wheel A is formed with a flange E, which extends parallel with the sleeve C, and with such sleeve forms an annular recess F, adapted to receive the springs D D'. The flange E is formed at a suitable point on its inner face with a recess $e$, within which is fixed a pin or stud $e'$, which serves to engage the outer ends of the springs, the latter being formed with a hook or eye encircling the pin. The inner ends of the springs D D' are preferably fastened to the sleeve C through the medium of rings G G'. The use of these rings is not essential, but considerably simplifies the assembling of the parts. Each of the rings G G' is formed with a slot $g$, which receives the inner end of its spring, the latter being bent to form a hook entering this slot, as shown in Fig. 1. Each ring is formed along its inner face with a series of semicircular recesses $g'$, which when the ring is turned upon the sleeve C successively register with a similar recess $c$, formed in the outer part of the latter.

In assembling the outer end of the spring D' is engaged with the stud $e'$ and its inner end with the ring G', and the latter is adjusted so that one of its recesses $g'$ registers with the recess $c$ of the sleeve, when a headless bolt or plug $h'$, Figs. 2 and 3, is inserted in the circular recess thus formed. It is not necessary that any stress be imparted to the spring D' at this time. The spring D is fixed to the stud $e'$ and its ring G, and the latter is rotated relatively to the sleeve C and fly-wheel until the requisite degree of compression is given to both springs, whereupon the nearest recess $g'$ is brought into coincidence with the recess $c$ of the sleeve, and the sleeve and ring are then fixed together by insertion of a plug or key $h$. To provide for readily accomplishing this compression of the springs, I form the ring G with diametrically opposite recesses $i$, which are adapted to receive a spanner or similar tool. Upon removal of the spanner the sleeve will rotate backwardly until the tension of the springs is equalized. This method of assembling has the advantage that it is not necessary to hold the sleeve rigid during compression of the springs, and the provision of the recesses $g'$ and $c$ affords a means for easily connecting the springs to the sleeve and for adjusting to a nicety the degree of compression best suited for resisting the relative movement of the fly-wheel and sleeve in each particular instance.

In order to secure the parts firmly in place, I preferably screw-thread the end of the sleeve C, as shown at $j$, and provide a collar H, adapted to screw thereon. The collar is formed with a semicircular recess $k$ in its hub, which registers with a like recess $c'$, forming a continuation of the recess $c$ of the sleeve C, when the collar is set tight on the latter. When the two recesses $k$ and $c'$ are brought into coincidence, they constitute a cylindrical socket, which is screw-threaded, and into which is screwed a plug $l$. Primarily the function of the plug $l$ is to constitute a key for locking the collar H in place upon the sleeve; but in the device shown I also utilize it to hold the plugs $h$ and $h'$ firmly in place. Each of these plugs is formed with a screw-threaded socket $m$, Fig. 3, to receive a suitable threaded tool, so that the plug may be easily withdrawn when necessary by first removing the screw-plug $k$.

It will be observed that the springs are completely housed by the collar H and flange E.

The freedom of movement of the fly-wheel relatively to its shaft may in the construction thus far described be limited only by the degree of compression of the springs. When used with rotary electric machines, it is desirable, if not essential, that this relative movement shall be such that if the fly-wheel were held stationary the armature could be rotated from one pole to the next. Preferably it is desirable in order to prevent overstraining of the springs to provide some mechanical stops for limiting the movement in case it should greatly exceed the normal, and such stops may be provided by forming a flange $C'$ on the end of the sleeve C with a lug $p$, which may encounter a rib $q$, Fig. 2, formed on the fly-wheel, the rib and lug being provided at any suitable angular distance, so as to give the desired amount of free movement before they come into contact.

It will be noted that the character of connection provided by my present invention permits a great relative movement of the fly-wheel and its shaft, so that my device is especially adapted for use with machines of but few poles, such as two-pole or four-pole machines, although applicable to those having a greater number, if desired. The construction provided by me is exceedingly strong and durable, while in compactness it compares favorably with the connection before referred to.

My invention is applicable to any form of motor device wherein the energy applied to it or that derived from it is fluctuating, so that the rotary device is subject to alternate acceleration and retardation, and thereby produces the effect known as "hunting" or "pumping." It is specifically adapted to synchronous alternating motors and rotary converters.

For the purpose of illustrating one of the applications of my invention I have shown in Figs. 4 and 5 two modes of applying my improved device to a synchronous dynamo-electric machine. In these figures, I indicates an alternating-current motor or other synchronous dynamo-electric machine of a well-known four-pole type, J its armature, and K its shaft. Such motors are well known and need not be further described. In Fig. 4 the fly-wheel A is mounted directly upon the armature-shaft K. This is not essential, however, as the shaft of the fly-wheel may be any shaft connected to the motor and rotating therewith. Thus in Fig. 5 I have shown the motor as belted to a counter-shaft $K'$ and the fly-wheel A mounted on this shaft, in which construction the same results are attained. It will also be understood that the spring connection provided by my invention need not be directly between the fly-wheel and its shaft, but may be interposed at any point between the motor and fly-wheel, so long as the described results are attained.

By the term "fly-wheel" as used in this specification I include not merely such a wheel as a mechanic would ordinarily understand by this term, but also any suitably symmetrical mass or masses so mounted and adapted as to act in a manner substantially equivalent to the action of a fly-wheel—that is to say, by rotating with the motor and by reason of its inertia resisting any acceleration or retardation of its normal speed of rotation.

My invention is to be distinguished from those structures wherein a spring connection is employed as the means through which power is communicated from a motor to the load or work carried thereby. Such means for yieldingly transmitting power are incapable of overcoming the effects of hunting or pumping. In the application of my invention the fly-wheel is essentially idle, forming ordinarily no part of the means through which power is transmitted, so that the function of its springs is confined solely, or substantially so, to the taking up of any relative fluctuations in the speed between the fly-wheel and motor. I therefore designate the fly-wheel of my invention as an "idle" fly-wheel, in the sense that no work, or at least no substantial part of the work performed by the motor, is transmitted through it. I do not hereby mean to exclude the possibility that such idle fly-wheel may at times be made the means through which work may be performed by the motor, it being well understood that with, for example, a synchronous alternating motor there is practical freedom from any hunting effect when carrying a considerable load, the action known as "hunting" occurring chiefly when the motor is run practically without load, at which time alone my invention is especially desirable for application to such motor, and it is sufficient that under such circumstances the fly-wheel shall become an idle fly-wheel in the sense herein indicated.

I claim as my invention the following-defined novel features, substantially as hereinbefore specified, namely:

1. The combination with a rotary motor, and an idle fly-wheel driven thereby, free to turn relatively thereto, of a spring connection between the two adapted to resist in either direction fluctuations in their relative speeds, comprising a spiral spring arranged to be wound or unwound by relative movements of said parts and means receiving the reaction of said spring.

2. The combination with a rotary dynamo-electric machine, and an idle fly-wheel driven thereby, free to turn relatively thereto, of a spring connection between the two adapted to resist in either direction fluctuations in their relative speeds, comprising a spiral spring encircling the axis of rotation of said fly-wheel, and arranged to be wound or unwound by relative movements of said parts and means receiving the reaction of said spring.

3. The combination with a rotary motor, and a fly-wheel driven thereby, free to turn relatively thereto, of a spring connection between the two comprising two reversely-arranged spiral springs adapted to be wound and unwound by relative movements of said fly-wheel and motor.

4. The combination with a rotary motor, and a fly-wheel driven thereby, free to turn relatively thereto, of a spring connection between the two comprising two reversely-arranged spiral springs encircling the axis of rotation of said fly-wheel, whereby to resist relative movements of said fly-wheel and motor.

5. The combination with a rotary motor, and a fly-wheel driven thereby, free to turn relatively thereto, of a connection between the two comprising two reversely-arranged involute springs each wound upon itself, and each engaged at its ends by the fly-wheel and motor respectively.

6. The combination with a rotary motor, and a fly-wheel driven thereby, free to turn relatively thereto, of a connection between the two comprising two reversely-arranged involute springs each wound upon itself, and each encircling the axis of said fly-wheel, whereby to resist relative movements of said fly-wheel and motor.

7. The combination with a rotary motor, and a fly-wheel driven thereby, free to turn relatively thereto, of a connection between the two comprising an involute spring connected to the fly-wheel at its outer end, means for adjusting the stress of said spring comprising an adjustable ring connected to the motor and engaging the inner end of said spring, and means receiving the reaction of said spring.

8. The combination with a rotary motor, and a fly-wheel driven thereby, free to turn relatively thereto, of a connection between the two comprising two reversely-arranged involute springs each connected to the fly-wheel at its outer end, and two rings connected to the motor and engaging the inner ends of said springs, and relatively adjustable to adjust the stress of said springs.

9. The combination with a rotary motor, of a shaft rotating therewith, a sleeve carried by said shaft, a fly-wheel free to turn on said sleeve, and two reversely-arranged spiral springs encircling said sleeve and connected thereto at their inner ends, and to the fly-wheel at their outer ends.

10. The combination with a rotary motor, of a shaft rotating therewith, a sleeve carried by said shaft, a fly-wheel free to turn on said sleeve, two rings encircling said sleeve, and two reversely-arranged spiral springs each encircling one of said rings and connected thereto at its inner end, and each connected to the fly-wheel at its outer end.

11. The combination with a rotary motor, of a shaft rotating therewith, a fly-wheel free to turn on said shaft, a ring encircling said shaft, a spiral spring encircling said ring, and means receiving the reaction of said spring, said spring connected to said fly-wheel and ring, and said shaft and ring each having a recess, and adapted to be moved to bring such recesses into coincidence, whereby the stress upon said spring may be adjusted by rotating said ring, and inserting a plug in said recesses, when the latter coincide.

12. The combination with a rotary motor, of a shaft rotating therewith, a sleeve fixed to said shaft, a fly-wheel free to turn on said sleeve, a ring encircling said sleeve, a spiral spring encircling said ring, and means receiving the reaction of said spring, said spring connected to said fly-wheel and ring, and said sleeve and ring each formed with a recess, and adapted to be moved to bring such recesses into coincidence, whereby the stress upon said spring may be adjusted by rotating said ring, and inserting a plug in said recesses when the latter coincide.

13. The combination with a rotary motor, of a shaft rotating therewith, a sleeve fixed to said shaft, a fly-wheel free to turn on said sleeve, a ring encircling said sleeve, a spiral spring encircling said ring, said means receiving the reaction of said spring, said spring connected to said fly-wheel and said ring, and said sleeve and ring formed the one with a plurality of recesses and the other with a recess, said parts adapted to be moved to bring such recesses into coincidence, whereby the stress upon said spring may be adjusted by rotating said ring, and inserting a plug in said recesses when the latter coincide.

14. The combination with a rotary motor, of a shaft rotating therewith, a sleeve fixed to said shaft, a fly-wheel free to turn on said sleeve, inner and outer rings encircling said sleeve, and spiral springs encircling said rings, said springs each connected to said fly-wheel and one of said rings, said sleeve formed with a recess, and said outer ring with a plurality of recesses, whereby the stress upon said springs may be adjusted by rotating said outer ring, and inserting a plug in said recesses in the ring and sleeve when such recesses coincide.

15. The combination with a rotary motor, of a shaft rotating therewith, a sleeve fixed to said shaft, a fly-wheel free to turn on said sleeve, inner and outer rings encircling said sleeve, and spiral springs encircling said rings, said springs each connected to said fly-wheel and one of said rings, said sleeve formed with a recess, and said outer ring with a plurality of recesses, whereby the stress upon said springs may be adjusted by rotating said outer ring, and inserting a plug in said recesses in the ring and sleeve when such recesses coincide, and a collar screwing on said sleeve and having a recess adapted to be brought into alinement with said recess in the sleeve, and a plug screwing into said alined recesses.

In witness whereof I have hereunto signed my name in the presence of two subscribing witnesses.

JAMES J. WOOD.

Witnesses:
E. J. KING,
W. F. MELEHING.